US012361898B2

(12) United States Patent
Xiao et al.

(10) Patent No.: US 12,361,898 B2
(45) Date of Patent: Jul. 15, 2025

(54) LIQUID CRYSTAL DISPLAY DEVICE

(71) Applicant: TCL China Star Optoelectronics Technology Co., Ltd., Guangdong (CN)

(72) Inventors: Guangxing Xiao, Guangdong (CN); Yu Wu, Guangdong (CN); Tao He, Guangdong (CN); Xuebing Zhou, Guangdong (CN); Xinghai Zhao, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/600,435

(22) PCT Filed: Aug. 10, 2021

(86) PCT No.: PCT/CN2021/111754

§ 371 (c)(1),
(2) Date: May 2, 2024

(87) PCT Pub. No.: WO2023/004882

PCT Pub. Date: Feb. 2, 2023

(65) Prior Publication Data

US 2024/0274096 A1 Aug. 15, 2024

(30) Foreign Application Priority Data

Jul. 27, 2021 (CN) ........................ 202110847427.5

(51) Int. Cl.
*G09G 3/34* (2006.01)
*G09G 3/20* (2006.01)
*G09G 3/36* (2006.01)

(52) U.S. Cl.
CPC ......... *G09G 3/3426* (2013.01); *G09G 3/2092* (2013.01); *G09G 3/36* (2013.01);
(Continued)

(58) Field of Classification Search
CPC .... G09G 3/2092; G09G 3/342; G09G 3/3426; G09G 3/34; G09G 3/36; G09G 2320/0233; G09G 2320/0257
See application file for complete search history.

(56) References Cited

U.S. PATENT DOCUMENTS

2009/0184917 A1* 7/2009 Park .................... G09G 3/3426 345/102
2010/0103089 A1* 4/2010 Yoshida ............... G09G 3/3426 345/102

(Continued)

FOREIGN PATENT DOCUMENTS

CN 1983366 6/2007
CN 103606356 2/2014

(Continued)

OTHER PUBLICATIONS

English Translation for CN104050931, Inventor Guo Simin, published on Sep. 17, 2014. (Year: 2014).*

*Primary Examiner* — William Boddie
*Assistant Examiner* — Saifeldin E Elnafia

(57) ABSTRACT

An LCD device includes: a display panel, one display frame of the display panel corresponds to multiple scan cycles of a backlight source, a light-emitting diode array of an arbitrary one of backlight partitions has a first brightness and a second brightness under controlling of a timer control register in the scan cycles, wherein the first brightness is lower than the second brightness, and the timer control register controls the light-emitting diode array of at least one of the backlight partitions to have the first brightness in each of the scan cycles.

6 Claims, 3 Drawing Sheets

(52) U.S. Cl.
CPC ............... *G09G 3/34* (2013.01); *G09G 3/342* (2013.01); *G09G 2320/0233* (2013.01); *G09G 2320/0257* (2013.01)

(56) References Cited

U.S. PATENT DOCUMENTS

| | | | | |
|---|---|---|---|---|
| 2010/0253615 | A1 | 10/2010 | Han | |
| 2011/0096101 | A1 * | 4/2011 | Lee | G09G 3/2022 345/102 |
| 2011/0141003 | A1 * | 6/2011 | Kim | G09G 3/342 345/102 |
| 2016/0078830 | A1 | 3/2016 | Huang | |
| 2018/0102097 | A1 * | 4/2018 | Cheng | G09G 3/342 |
| 2021/0097940 | A1 | 4/2021 | Chen | |

FOREIGN PATENT DOCUMENTS

| | | |
|---|---|---|
| CN | 104050931 | 9/2014 |
| CN | 110033732 | 7/2019 |
| CN | 112017603 | 12/2020 |
| CN | 112114717 | 12/2020 |

* cited by examiner

LIQUID CRYSTAL DISPLAY DEVICE

CROSS REFERENCE TO RELATED APPLICATIONS

This application is a National Phase of PCT Patent Application No. PCT/CN2021/111754 having International filing date of Aug. 10, 2021, which claims the benefit of priority of Chinese Patent Application No. 202110847427.5 filed on Jul. 27, 2021. The contents of the above applications are all incorporated by reference as if fully set forth herein in their entirety.

TECHNICAL FIELD

The present application relates to a field of a display, and more particularly to a liquid crystal display (LCD) device.

BACKGROUND

Recently, the LCD device is widely used in various applications, such as televisions or personal computers. However, because of inherent characteristics of liquid crystal cells, the LCD device usually has the low response speed causing the specific performance that the tailing and after-image phenomena tend to occur upon displaying high-speed dynamic frames, thereby causing the problem that the LCD device has poor display effects.

SUMMARY

Technical Problems

The present application provides an LCD device and a driving method thereof to effectively reduce the tailing and after-image phenomena of the LCD device upon displaying the high-speed dynamic frames, and to enhance the display effect of the display panel.

Technical Solutions

The present application provides an LCD device including: a backlight source and a display panel disposed on the backlight source, wherein the backlight source includes multiple backlight partitions arranged in rows, each of the backlight partitions is correspondingly provided with a light-emitting diode array, and the LCD device further includes a timer control register electrically connected to the backlight source and the display panel, wherein one display frame of the display panel corresponds to multiple scan cycles of the backlight source, the light-emitting diode array of an arbitrary one of the backlight partitions in the scan cycles has a first brightness and a second brightness under controlling of the timer control register, the light-emitting diode array of at least one of the backlight partitions has the first brightness in each of the scan cycles, and the first brightness is lower than the second brightness.

Optionally, one display frame of the display panel corresponds to two or four of the scan cycles of the backlight source.

Optionally, one display frame of the display panel corresponds to four of the scan cycles of the backlight source.

Optionally, in at least two scan cycles of the four scan cycles, the timer control register controls the light-emitting diode array of at least one of the backlight partitions to have the second brightness.

Optionally, the four scan cycles are respectively a first scan cycle, a second scan cycle, a third scan cycle and a fourth scan cycle proceeding in sequence, wherein:

in the first scan cycle or the third scan cycle, the timer control register controls all of the light-emitting diode arrays of the backlight partitions to have the first brightness; and in the second scan cycle or the fourth scan cycle, the timer control register controls the light-emitting diode arrays of a portion of the backlight partitions to have the first brightness, and controls the light-emitting diode arrays of the other portion of the backlight partitions to have the second brightness.

Optionally, the backlight partitions, where the light-emitting diode arrays having the first brightness are located in the second scan cycle, are different from the backlight partitions, where the light-emitting diode arrays having the first brightness are located in the fourth scan cycle.

Optionally, in different scan cycles of the four scan cycles, the timer control register controls the light-emitting diode arrays of the different backlight partitions to have the first brightness.

Optionally, the four scan cycles are respectively a first scan cycle, a second scan cycle, a third scan cycle and a fourth scan cycle proceeding in sequence, and the backlight partitions includes a first backlight partition, a second backlight partition, a third backlight partition and a fourth backlight partition arranged in sequential rows from one side of the backlight source, wherein:

in the first scan cycle, the timer control register controls the light-emitting diode array of the second backlight partition to have the first brightness, and controls the light-emitting diode arrays of the other backlight partitions to have the second brightness;

in the second scan cycle, the timer control register controls the light-emitting diode array of the third backlight partition to have the first brightness, and controls the light-emitting diode arrays of the other backlight partitions to have the second brightness;

in the third scan cycle, the timer control register controls the light-emitting diode array of the fourth backlight partition to have the first brightness, and controls the light-emitting diode arrays of the other backlight partitions to have the second brightness; and in the fourth scan cycle, the timer control register controls the light-emitting diode array of the first backlight partition to have the first brightness, and controls the light-emitting diode arrays of the other backlight partitions to have the second brightness.

Optionally, the LCD device has a first display mode and a second display mode, the LCD device displays a non-dynamic frame in the first display mode, and the LCD device displays dynamic frames in the second display mode, wherein:

the timer control register has a first control mode corresponding to the first display mode and a second control mode corresponding to the second display mode;

in the first control mode, the light-emitting diode array of the backlight partitions has the second brightness in each of the scan cycles; and in the second control mode, the light-emitting diode array of an arbitrary one of the backlight partitions has the first brightness and the second brightness in the scan cycles, the light-emitting diode array of at least one of the backlight partitions has the first brightness in each of the scan cycles, and the first brightness is lower than the second brightness.

Optionally, a size of the backlight source is smaller than or equal to 200 μm.

Beneficial Effect

The LCD device provided by the present application can effectively reduce the tailing and after-image phenomena of the LCD device upon displaying the high-speed dynamic frames, and enhance the display effect of the display panel.

BRIEF DESCRIPTION OF THE DRAWINGS

In order to explain the technical solution in the present application more clearly, the drawings required for the description of the embodiments will be briefly introduced. Obviously, the drawings in the following description only relate to some embodiments of the present application. Other drawings can be obtained from these drawings without creative works for those skilled in the art.

EMBODIMENTS OF THE INVENTION

Figure 1:
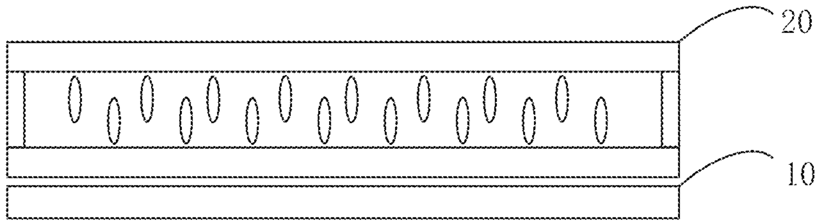
FIG. 1 is a schematic structure view showing a LCD device provided by an embodiment of the present application.

The technical solutions in the embodiments of the present application will be clearly and completely described below in conjunction with the drawings in the embodiments of the present application. Obviously, the embodiments described are only a part of the embodiments of the present application, rather than all the embodiments. Based on the embodiments in the present application, all other embodiments obtained by those skilled in the art without creative works should be deemed as falling within the claims of the present application. In addition, it should be understood that the specific implementations described here are only used to illustrate and explain the present application without limiting the present application. In the present application, unless otherwise described, the used orientation words, such as "upper" and "lower", generally refer to the upper and lower positions of the device in the actual using or working state, and specifically refer to the drawing directions in the drawings; and "inner" and "outer" refer to the outline of the device.

First Embodiment

An embodiment of the present application provides a LCD device, the LCD device includes: a backlight source and a display panel disposed on the backlight source, the backlight source includes multiple backlight partitions arranged in rows, each of the backlight partitions is correspondingly provided with a light-emitting diode array, and the LCD device further includes a timer control register electrically connected to the backlight source and the display panel; wherein one display frame of the display panel corresponds to multiple scan cycles of the backlight source, the light-emitting diode array of an arbitrary one of the backlight partitions in the scan cycles has a first brightness and a second brightness under controlling of the timer control register, the light-emitting diode array of at least one of the backlight partitions has the first brightness in each of the scan cycles, and the first brightness is lower than the second brightness.

FIG. 1 is a schematic structure view showing a LCD device provided by an embodiment of the present application. Specifically, a light emitting element in a backlight source 10 is, for example, a mini-light-emitting diode (mini-LED) chip having a size, which is smaller than or equal to 200 μm and specifically represents the length and width of the mini-LED chip. Adopting the light emitting element formed in the mini-LED chip can implement the partition configuration of the backlight source 10. Collocating with a display panel 20 on the backlight source 10 can implement more gorgeous color display effects, and have advantages of the high contrast and the high color rendering performance. In addition, compared with the ordinary backlight source 10, the backlight source 10 can be made thinner; and compared with the micro light-emitting diode (micro-LED) and organic light emitter diode (OLED), the backlight source 10 has the lower process difficulty, and the lower material cost.

In this embodiment, the display panel 20 is disposed on the backlight source 10, and specifically includes an array substrate, a color filter substrate and a liquid crystal layer encapsulated between the array substrate and the color filter substrate. It is to be described that the color filter substrate does not necessarily include a color filter (CF), and the color filter may further be directly disposed on the array substrate.

Figure 2:
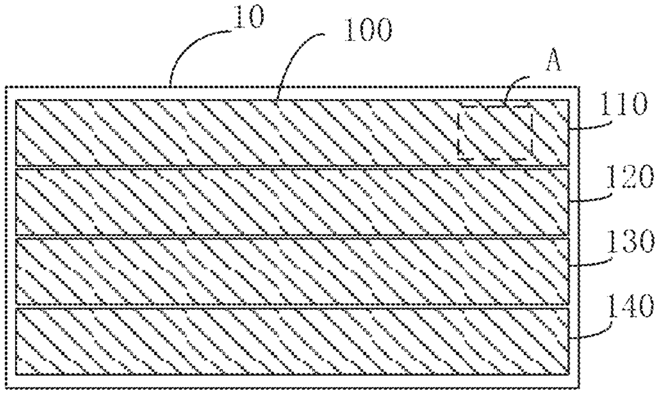
FIG. 2 is a schematic structure view showing a backlight source provided by an embodiment of the present application.
Figure 3:
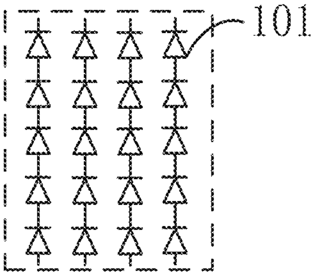
FIG. 3 is an enlarged structure view showing a portion A in FIG. 2.

FIG. 2 is a schematic structure view showing a backlight source provided by an embodiment of the present application. FIG. 3 is an enlarged structure view showing a portion A in FIG. 2. Referring to FIGS. 2 and 3, the backlight source 10 includes multiple backlight partitions 100 arranged in rows, wherein each backlight partition 100 is correspondingly provided with a light-emitting diode array including multiple light-emitting diodes 101, which are arranged in an array and are the mini-LED chips. The backlight partitions 100 includes, for example, a first backlight partition 110, a second backlight partition 120, a third backlight partition 130 and a fourth backlight partition 140, which are arranged in rows successively from one side of the backlight source 10.

Figure 4:
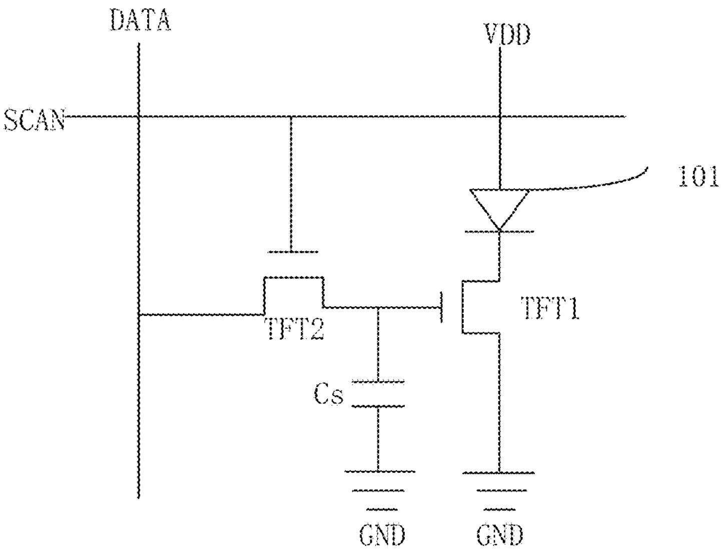
FIG. 4 is an equivalent circuit diagram showing a backlight driving circuit provided by an embodiment of the present application.

FIG. 4 is an equivalent circuit diagram showing a backlight driving circuit provided by an embodiment of the present application. Referring to FIG. 4, each of the backlight driving circuits includes a light-emitting diode 101, a first transistor TFT1, a second transistor TFT2 and a capacitor Cs. One end of the light-emitting diode 101 is connected to a VDD signal, and the other end of the light-emitting diode 101 is connected to one of a source and a drain of the first transistor TFT1. The other one of the source or the drain of the first transistor TFT1 is connected to the ground GND, and a gate of the first transistor TFT1 is electrically connected to one of a source and a drain of the second transistor TFT2. The other one of the source or the drain of the second transistor TFT2 is connected to a data signal DATA, and a gate of the second transistor TFT2 is connected to a scan signal SCAN. One end of the capacitor Cs is electrically connected to the gate of the first transistor TFT1, and the other end of the capacitor Cs is connected to the ground GND.

In this embodiment, the timer control register (T-CON) is electrically connected to the display panel 20. Specifically, the LCD device further includes, for example, a system on a chip (SOC), and the SOC is mainly used to receive a video signal, and then process the video signal to obtain a display signal of the display panel 20. The timer control register drives the display panel 20 according to the display signal sent from the SOC, thereby implementing the frame display.

Figure 5:
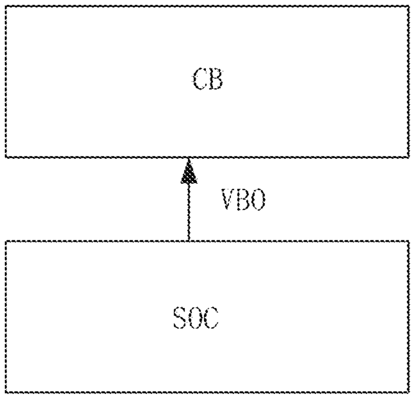
FIG. 5 is a schematic connection view showing a system on a chip (SOC) and a control board provided by an embodiment of the present application.

FIG. 5 is a schematic connection view showing the SOC and a control board provided by an embodiment of the present application. Referring to FIG. 5, the timer control register in this embodiment is integrated on a control board CB, for example, wherein the SOC transmits a VBO signal to the control board through the V-By-One technology. Upon transmission of the VBO signal, after handshakes between the timer control register and the SOC succeed, a display communication sequence is entered to perform the transmission of the VBO signal. The VBO signal further includes a time control signal embedded into a data signal.

In this embodiment, the timer control register has, for example, a first control mode and a second control mode. For example, the first control mode corresponds to a mode when the display panel 20 displays a normal frame, and the second control mode corresponds to a mode when the display panel 20 displays dynamic frames. When the display panel 20 displays the dynamic frames, the timer control register can receive a mode switch instruction and switch the mode from the first control mode to the second control mode, and the mode switch instruction may be sent through a switch button activated by a user, and may also be sent through a detection module capable of automatically detecting a display frame.

In this embodiment, when the display panel 20 displays the normal frame, the light-emitting diode array in the multiple backlight partitions 100 of the backlight source 10 has a standard brightness value. When the display panel 20 displays the dynamic frames, the timer control register in the LCD device can be switched to the second control mode to eliminate the tailing and after-image phenomena present in the conventional LCD device by regulating the light-emitting mechanism of the backlight source 10, wherein the second control mode corresponds to a motion estimate and motion compensation (MEMC) mode of the LCD device.

Specifically, the timer control register is still electrically connected to the backlight source 10 to control the light-emitting mode of the light-emitting diode array in the backlight source 10. In addition, the timer control register adopts the frequency doubling technology of over driving by adjusting the light-emitting time of the light-emitting diode array in the backlight source 10 in a row-by-row manner, so that the display panel 20 can display the dynamic frames better. In the frequency doubling technology, the refresh frequency of the backlight source 10 is an integer multiple of the refresh frequency of the display frame. That is, one display frame of the display panel 20 corresponds to multiple scan cycles of the backlight source 10. For example, in the frequency doubling technology, one display frame of the display panel 20 corresponds to two scan cycles of the backlight source 10. In the frequency quadrupling technology, one display frame of the display panel 20 corresponds to four scan cycles of the backlight source 10. The display panel 20 has a refresh frequency of 120 HZ, for example. Correspondingly, in the frequency doubling technology, the backlight source 10 has a refresh frequency of 240 HZ. In the frequency quadrupling technology, the backlight source 10 has a refresh frequency of 480 HZ.

Figure 6:
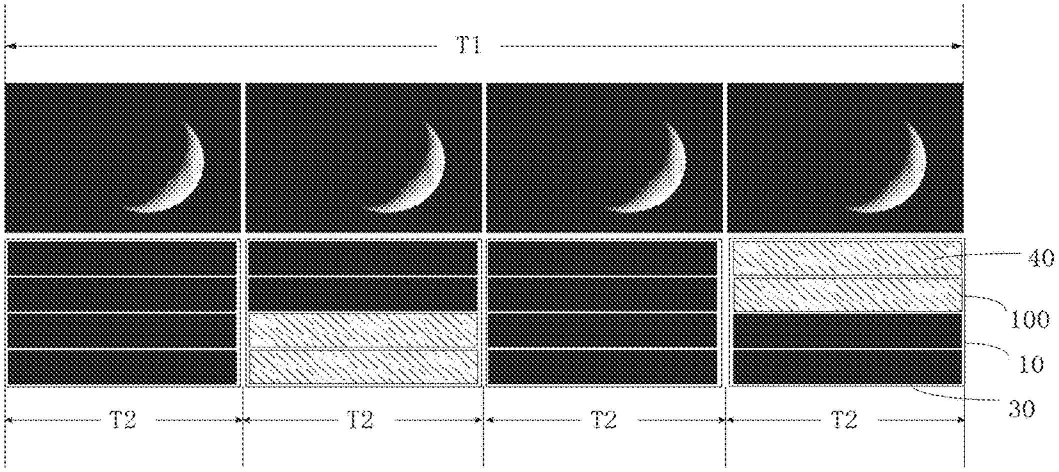
FIG. 6 is a schematic view showing one display frame provided by an embodiment of the present application corresponding to multiple scan cycles of the backlight source.

FIG. 6 is a schematic view showing one display frame provided by an embodiment of the present application corresponding to multiple scan cycles of the backlight source. Referring to FIG. 6 in this embodiment, the time of displaying one display frame is T1, one scan cycle of the backlight source is T2, the light-emitting diode array of an arbitrary one of the backlight partitions 100 in the scan cycles T2 corresponding to one display frame has a first brightness 30 and a second brightness 40 under controlling of the timer control register. That is, the light-emitting diode array of an arbitrary one of the backlight partitions 100 has two different brightnesses in the period when the display panel 20 displays one display frame. The first brightness 30 is lower than the second brightness 40. When the light-emitting diode array has the first brightness 30, the mini-LED light-emitting diodes in the light-emitting diode array may enter a black insertion mode corresponding to an OFF (turned off) state, or a low brightness mode having the specific brightness value. When the light-emitting diode array has the second brightness 40, the mini-LED light-emitting diode in the light-emitting diode array may enter a standard brightness mode under the first control mode. In each of the scan cycles T2, the timer control register controls the light-emitting diode array of at least one backlight partition 100 to have the first brightness 30. The present application eliminates the tailing and after-image phenomena when the display panel 20 displays the dynamic frames by regulating the light-emitting mechanism of the backlight source 10 through the timer control register.

In this embodiment, one display frame of the display panel 20 corresponds to two or four scan cycles T2 of the backlight source 10.

In the following, detailed descriptions are made according to an example, in which one display frame of the display panel 20 corresponding to four scan cycles T2 in the backlight source 10.

In this embodiment, the timer control register controls the light-emitting diode array of at least one backlight partition 100 to have the second brightness 40 in at least two scan cycles T2 of the four scan cycles T2.

The four scan cycles T2 are respectively a first scan cycle, a second scan cycle, a third scan cycle and a fourth scan cycle, which proceed in sequence and have the same corresponding time period.

In the first scan cycle or the third scan cycle, the timer control register controls all of the light-emitting diode arrays of the backlight partitions 100 to have the first brightness 30.

In the second scan cycle or the fourth scan cycle, the timer control register controls the light-emitting diode array of a portion of the backlight partitions 100 to have the first brightness 30, and controls the light-emitting diode array of the other backlight partitions 100 to have the second brightness 40. In addition, the backlight partitions 100, where the light-emitting diode arrays having the first brightness 30 are located in the second scan cycle, are different from the backlight partitions 100, where the light-emitting diode arrays having the first brightness 30 are located in the fourth scan cycle. The backlight partition 100, where the light-emitting diode array has the first brightness 30 is located in the second scan cycle, and the backlight partitions 100, where the light-emitting diode arrays having the first brightness 30 are located in the fourth scan cycle, constitute all the backlight partitions 100 of the backlight source 10.

In this embodiment, the first brightness 30 corresponds to the brightness value when the light-emitting diode array is in the OFF state, and the second brightness 40 corresponds to the standard brightness value of the light-emitting diode array in the first control mode.

In this embodiment, the display panel 20 has the frame refresh frequency of 120 HZ, and the backlight source 10 has the refresh frequency of 480 HZ. In the first scan cycle, the light-emitting diode arrays of all of the backlight partitions 100 of the backlight source 10 are in the OFF state. That is, the whole backlight source 10 is in the black insertion mode. In the second scan cycle, the light-emitting diode arrays of the top half of the backlight partitions 100 of the backlight source 10 are in the OFF state, and the light-emitting diode arrays of the bottom half of the backlight partitions 100 are in the ON (turned on) state. That is, the top half of the backlight source 10 is in the black insertion mode and the bottom half of the backlight source 10 is in the standard brightness mode. In the third scan cycle, the light-emitting diode arrays of all of the backlight partitions 100 of the backlight source 10 are in the OFF state. That is, the whole backlight source 10 is in the black insertion mode. In the fourth scan cycle, the light-emitting diode arrays of the bottom half of the backlight partitions 100 of the backlight source 10 are in the OFF state, and the light-emitting diode arrays of the top half of the backlight partitions 100 are in the ON state. That is, the bottom half of the backlight source 10 is in the black insertion mode, and the top half of the backlight source 10 is in the standard brightness mode. It is to be described that the half of the backlight partition 100 may include several backlight partitions 100.

In the LCD device provided by the embodiment of the present application, the timer control register controls the black insertion mode of the backlight partitions in different scan cycles in the frequency multiplying state, so that when the liquid crystal molecules in the liquid crystal layer in the liquid crystal panel are flipping, the light-emitting diode arrays in at least a partial area do not perform the charge/discharge operation, so that the user cannot clearly see the visual flip caused by the liquid crystal flipping, the visual blur is reduced, and the tailing and after-image phenomena are eliminated.

Figure 8:
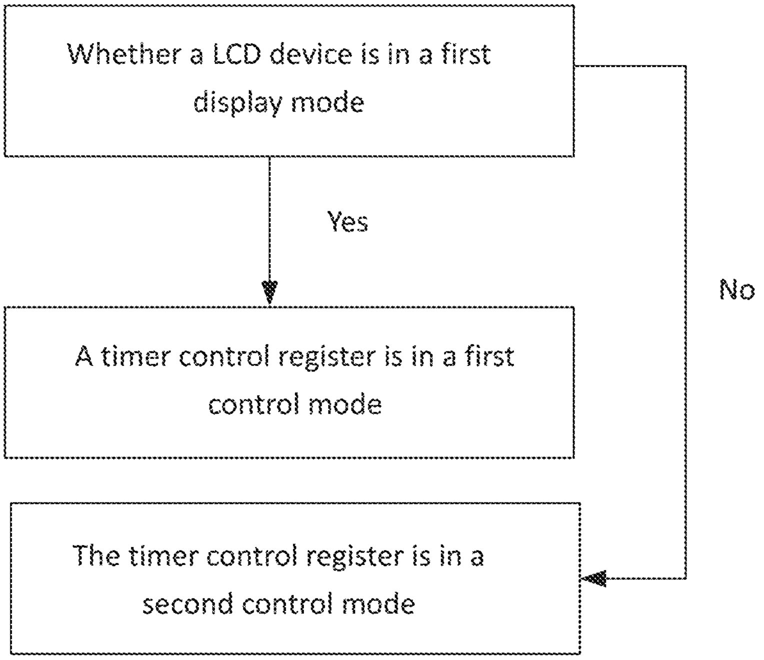
FIG. 8 is a schematic view showing a mode switching process of the LCD device provided by an embodiment of the present application.

FIG. 8 is a schematic view showing a mode switching process of the LCD device provided by an embodiment of the present application. Referring to FIG. 8, the LCD device in this embodiment has a first display mode and a second display mode, wherein the LCD device displays a non-dynamic frame in the first display mode, and displays dynamic frames in the second display mode.

The timer control register has a first control mode corresponding to the first display mode, and a second control mode corresponding to the second display mode.

In the first control mode, the light-emitting diode array of the backlight partitions has the second brightness in each of the scan cycles.

In the second control mode, the light-emitting diode array of an arbitrary one of the backlight partitions has the first brightness and the second brightness in the scan cycles, the light-emitting diode array of at least one of the backlight partitions has the first brightness in each of the scan cycles, and the first brightness is lower than the second brightness.

The first display mode is specifically the non-MEMC mode; and the second display mode is specifically the MEMC mode.

Second Embodiment

The second embodiment of the present application provides a LCD device including a backlight source and a display panel disposed on the backlight source. The backlight source includes multiple backlight partitions arranged in rows, and each of the backlight partitions is correspondingly provided with a light-emitting diode array. The LCD device further includes a timer control register electrically connected to the backlight source and the display panel, wherein one display frame of the display panel corresponds to multiple scan cycles of the backlight source, the light-emitting diode array of an arbitrary one of the backlight partitions in the scan cycles has a first brightness and a second brightness under controlling of the timer control register, the first brightness is lower than the second brightness, and the timer control register controls the light-emitting diode array of at least one of the backlight partitions to have the first brightness in each of the scan cycles.

Figure 7:
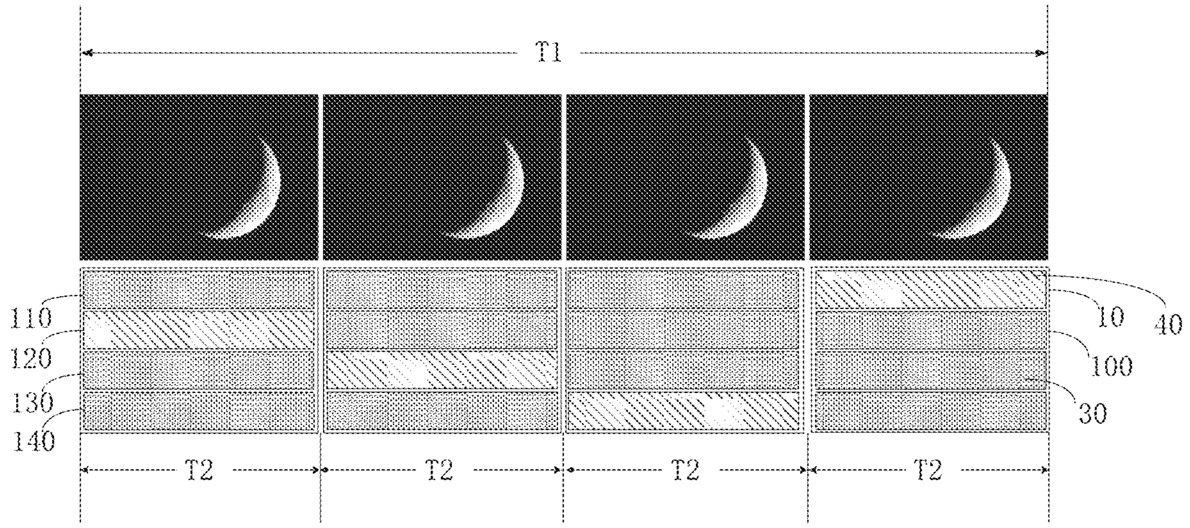
FIG. 7 is a schematic view showing one display frame provided by an embodiment of the present application corresponding to multiple scan cycles of the backlight source.

FIG. 7 is a schematic view showing one display frame provided by an embodiment of the present application corresponding to multiple scan cycles of the backlight source. Referring to FIG. 7, the LCD device provided by the second embodiment of the present application is similar to the LCD device of the embodiment, and detailed descriptions of the same parts in this embodiment will be omitted. The difference in this embodiment resides in that the time of displaying one display frame is T1, one scan cycle of the backlight source is T2, and the timer control register respectively controls the light-emitting diode arrays of different backlight partitions 100 to have the first brightness 30 in the different scan cycles T2 of the four scan cycles T2.

In this embodiment, the four scan cycles T2 are respectively a first scan cycle, a second scan cycle, a third scan cycle and a fourth scan cycle proceeding in sequence, and the backlight partitions 100 includes the first backlight partition 110, the second backlight partition 120, the third backlight partition 130 and the fourth backlight partition 140 arranged in sequential rows from one side of the backlight source 10, wherein:

in the first scan cycle, the timer control register controls the light-emitting diode array of the second backlight partition 120 to have the first brightness 30, and controls the light-emitting diode arrays of the other backlight partitions 100 to have the second brightness 40;

in the second scan cycle, the timer control register controls the light-emitting diode array of the third backlight partition 130 to have the first brightness 30, and controls the light-emitting diode arrays of the other backlight partitions 100 to have the second brightness 40;

in the third scan cycle, the timer control register controls the light-emitting diode array of the fourth backlight partition 140 to have the first brightness 30, and controls the light-emitting diode arrays of the other backlight partitions 100 to have the second brightness 40; and in the fourth scan cycle, the timer control register controls the light-emitting diode array the first backlight partition 110 to have the first brightness 30, and controls the light-emitting diode arrays of the other backlight partitions 100 to have the second brightness 40.

In this embodiment, the first brightness 30 corresponds to the specific brightness value when the light-emitting diode array is in the low brightness mode, and the second brightness 40 corresponds to the standard brightness value when the light-emitting diode array is in the first control mode.

Compared with the black insertion mode of significantly reducing the overall brightness of the backlight source 10 in the first embodiment of the present application, the second embodiment of the present application corresponds the first brightness 30 to the specific brightness value when the light-emitting diode array is in the low brightness mode, can effectively increase the overall brightness of the backlight source 10, and can further enhance the display effect.

In this embodiment, the display panel 20 has the frame refresh frequency of 120 HZ, and the backlight source 10 has the refresh frequency of 480 HZ. In the first scan cycle, the light-emitting diode array of the second backlight partition 120 is in the low brightness mode, the light-emitting diode arrays of the other backlight partitions 100 are in the standard brightness mode. In the second scan cycle, the light-emitting diode array of the third backlight partition 130 is in the low brightness mode, and the light-emitting diode arrays of the other backlight partitions 100 are in the standard brightness mode. In the third scan cycle, the light-emitting diode array of the fourth backlight partition 140 is in the low brightness mode, and the light-emitting diode arrays of the other backlight partitions 100 are in the standard brightness mode. In the fourth scan cycle, the light-emitting diode array of the first backlight partition 110 is in the low brightness mode, and the light-emitting diode arrays of the other backlight partitions 100 are in the standard brightness mode.

In summary, embodiment of the present application provides a LCD device including: a backlight source and a display panel disposed on the backlight source, wherein the backlight source includes multiple backlight partitions arranged in rows, each of the backlight partitions is correspondingly provided with a light-emitting diode array, and the LCD device further includes a timer control register electrically connected to the backlight source and the display panel; wherein one display frame of the display panel corresponds to multiple scan cycles of the backlight source, the light-emitting diode array of an arbitrary one of the backlight partitions in the scan cycles has a first brightness and a second brightness under controlling of the timer control register, the light-emitting diode array of at least one of the backlight partitions has the first brightness in each of the scan cycles, and the first brightness is lower than the second brightness. The LCD device provided by the present application can effectively reduce the tailing and after-image phenomena of the LCD device upon displaying the high-speed dynamic frames, and enhance the display effect of the display panel.

Detailed descriptions have been made with respect to the display panels provided by the embodiments of the present application. In this disclosure, specific examples are used to explain the principles and implementation of the present application. The descriptions of the above-mentioned embodiments are only used to help readers understand the method and core idea of the present application. Meanwhile, those skilled in the art will make changes to the specific implementation and the application scope according to the idea of the present application. In summary, the contents of this specification should not be construed as a limitation to the present application.

What is claimed is:

1. A liquid crystal display (LCD) device, comprising:
- a backlight source;
- a display panel disposed on the backlight source, wherein the backlight source comprises multiple backlight partitions arranged in rows, and each of the backlight partitions is correspondingly provided with a light-emitting diode array; and
- a timer control register electrically connected to the backlight source and the display panel, wherein one display frame of the display panel corresponds to multiple scan cycles of the backlight source, the light-emitting diode array of an arbitrary one of the backlight partitions in the scan cycles has a first brightness and a second brightness under controlling of the timer control register, the light-emitting diode array of at least one of the backlight partitions has the first brightness in each of the scan cycles, and the first brightness is lower than the second brightness,
- wherein the one display frame of the display panel corresponds to four of the scan cycles of the backlight source,
- in different scan cycles of the four scan cycles, the timer control register controls the light-emitting diode arrays of the different backlight partitions to have the first brightness, and
- the four scan cycles are respectively a first scan cycle, a second scan cycle, a third scan cycle and a fourth scan cycle proceeding in sequence, and the backlight partitions comprises a first backlight partition, a second backlight partition, a third backlight partition and a fourth backlight partition arranged in sequential rows from one side of the backlight source, wherein:
  - in the first scan cycle, the timer control register controls the light-emitting diode array of the second backlight partition to have the first brightness, and controls the light-emitting diode arrays of the other backlight partitions to have the second brightness;
  - in the second scan cycle, the timer control register controls the light-emitting diode array of the third backlight partition to have the first brightness, and controls the light-emitting diode arrays of the other backlight partitions to have the second brightness;
  - in the third scan cycle, the timer control register controls the light-emitting diode array of the fourth backlight partition to have the first brightness, and controls the light-emitting diode arrays of the other backlight partitions to have the second brightness; and
  - in the fourth scan cycle, the timer control register controls the light-emitting diode array of the first backlight partition to have the first brightness, and controls the light-emitting diode arrays of the other backlight partitions to have the second brightness.

2. The LCD device according to claim 1, wherein the display panel has a refresh frequency of 120 HZ, and the backlight source has a refresh frequency of 240 HZ or 480 HZ.

3. The LCD device according to claim 2, wherein a size of the backlight source is smaller than or equal to 200 μm.

4. The LCD device according to claim 1, wherein the LCD device has a first display mode and a second display mode, the LCD device displays a non-dynamic frame in the first display mode, and the LCD device displays dynamic frames in the second display mode;
- the timer control register has a first control mode corresponding to the first display mode and a second control mode corresponding to the second display mode;

in the first control mode, the light-emitting diode array of the backlight partitions has the second brightness in each of the scan cycles; and in the second control mode, the light-emitting diode array of an arbitrary one of the backlight partitions has the first brightness and the second brightness in the scan cycles, the light-emitting diode array of at least one of the backlight partitions has the first brightness in each of the scan cycles, and the first brightness is lower than the second brightness.

5. The LCD device according to claim 4, wherein a size of the backlight source is smaller than or equal to 200 μm.

6. The LCD device according to claim 1, wherein a size of the backlight source is smaller than or equal to 200 μm.

* * * * *